(12) United States Patent
Murray, II

(10) Patent No.: US 11,594,904 B2
(45) Date of Patent: Feb. 28, 2023

(54) METHOD AND APPARATUS FOR REDUCING BATTERY STRESS

(71) Applicant: Richard Brian Murray, II, Toledo, OH (US)

(72) Inventor: Richard Brian Murray, II, Toledo, OH (US)

(*) Notice: Subject to any disclaimer, the term of this patent is extended or adjusted under 35 U.S.C. 154(b) by 180 days.

(21) Appl. No.: 17/060,292

(22) Filed: Oct. 1, 2020

(65) Prior Publication Data

US 2021/0021142 A1 Jan. 21, 2021

Related U.S. Application Data

(63) Continuation-in-part of application No. 16/857,985, filed on Apr. 24, 2020, now abandoned.

(60) Provisional application No. 62/920,348, filed on Apr. 25, 2019.

(51) Int. Cl.
*H02J 7/00* (2006.01)
*H02J 7/02* (2016.01)

(52) U.S. Cl.
CPC .......... *H02J 7/0048* (2020.01); *H02J 7/0013* (2013.01); *H02J 7/00032* (2020.01); *H02J 7/02* (2013.01)

(58) Field of Classification Search
CPC ................................................. H02J 7/0048

USPC ........................................................ 320/108
See application file for complete search history.

(56) References Cited

U.S. PATENT DOCUMENTS

| 2014/0245036 | A1* | 8/2014 | Oishi | H01M 10/44 |
| | | | | 713/300 |
| 2017/0066342 | A1* | 3/2017 | Butler | H02J 7/0047 |
| 2018/0254664 | A1* | 9/2018 | Tanabe | H02J 50/10 |
| 2020/0036215 | A1* | 1/2020 | Wan | H02J 7/00 |

* cited by examiner

*Primary Examiner* — Yalkew Fantu
(74) *Attorney, Agent, or Firm* — Marshall & Melhorn, LLC

(57) ABSTRACT

A method and apparatus for charging one or more rechargeable batteries or secondary cells. The method includes providing an external source of power, one or more rechargeable batteries or secondary cells, and a charging device. The charging device includes one or more computing or control devices and one or more semiconductor devices. At least a portion of the one or more semiconductor devices are in electrical communication with the external power source and at least a portion of the one or more semiconductor devices are in electrical communication with at least a portion of the one or more rechargeable batteries or secondary cells. Once a charging mode has been selected, the charging device will allow the external source of power to supply an amount of power to the one or more rechargeable batteries or secondary cells.

8 Claims, 8 Drawing Sheets

METHOD AND APPARATUS FOR REDUCING BATTERY STRESS

CROSS-REFERENCE TO RELATED APPLICATIONS

The present application claims the benefit to U.S. Provisional Patent Application No. 62/920,348 filed on Apr. 25, 2019 and U.S. Non-provisional patent application Ser. No. 16/857,985 filed on Apr. 24, 2020, which are incorporated herein by reference in their entirety.

FIELD OF THE DISCLOSURE

The present disclosure relates to a method and apparatus for reducing or eliminating an amount of stress experienced by a rechargeable battery or secondary cell.

BACKGROUND OF THE DISCLOSURE

Various methods for improving the overall life of a rechargeable battery or secondary cell are known in the art. These methods however fail to reduce or eliminate the overall amount of deterioration or degradation to the rechargeable battery or secondary cell that occurs while the rechargeable battery or secondary cell is being charged. As a result, it would be advantageous to develop a method and apparatus that reduces or eliminates the overall amount of stress, deterioration, and/or degradation that a rechargeable battery or secondary cell may experience when being charged in order to increase the overall life of the rechargeable battery or secondary cell.

SUMMARY OF THE DISCLOSURE

A method and apparatus for charging one or more rechargeable batteries or secondary cells. The method includes providing an external source of power, one or more rechargeable batteries or secondary cells, and a charging device. The charging device includes one or more computing or control devices and one or more semiconductor devices. At least a portion of the one or more semiconductor devices are in electrical communication with the external power source and at least a portion of the one or more semiconductor devices are in electrical communication with at least a portion of the one or more rechargeable batteries or secondary cells. Once a charging mode has been selected, the charging device will allow the external source of power to supply an amount of power to the one or more rechargeable batteries or secondary cells.

According to an aspect of the disclosure, the one or more semiconductor devices may be one or more transistors.

According to any one of the previous aspects of the disclosure, the charging mode selected by the user may be a normal charging mode, a during use charging mode, or an overnight charging mode.

According to any one of the previous aspects of the disclosure, if the overnight charging mode is selected, the user will be prompted and/or retested to input one or more wake-up times. Once inputted, a power level within the one or more rechargeable batteries or secondary cells may be identified or determined. An amount of time needed to increase the power level within the one or more rechargeable batteries or secondary cells by one percent may be determined. An amount of time needed to fully charge the one or more rechargeable batteries or secondary cells may be determined. The amount of time needed to fully charge the one or more rechargeable batteries or secondary cells may be based on the power level for the one or more rechargeable batteries or secondary cells identified and the amount of time needed to increase the power level within the one or more rechargeable batteries or secondary cells by one percent previously determined. The one or more rechargeable batteries or secondary cells may then be supplied with an amount of power at a time prior to the one or more wake-up time(s) inputted substantially equal to the amount of time needed to fully charge the one or more rechargeable batteries or secondary cells determined.

According to any one of the previous aspects of the disclosure, wherein the method further comprises the step of determining an amount of time needed for the power level within the one or more rechargeable batteries or secondary cells to drop by one percent.

According to any one of the previous aspects of the disclosure, wherein the method further comprises the step of determining whether or not the power level within the one or more rechargeable batteries or secondary cells will fall below a pre-determined minimum threshold before the one or more rechargeable batteries are supplied with the wake-up time amount of power. This determination may be based on the amount of time needed for the power level within the one or more rechargeable batteries or secondary cells to drop by one percent determined, the power level within the one or more rechargeable batteries or secondary cells, and an amount of time between the current time and the one or more wake-up time(s) inputted by the user.

According to any one of the previous aspects of the disclosure, wherein the method further comprises the step of supplying the one or more rechargeable batteries or secondary cells with an amount of power if it is determined that the power level within the one or more rechargeable batteries or secondary cells will fall below the pre-determined minimum threshold.

According to any one of the previous aspects of the disclosure, wherein the method further comprises the steps of providing a cloud-based server and transmitting data to the cloud-based server. The data transmitted to the cloud-based server may relate to a manufacturer of the one or more rechargeable batteries or secondary cells, a model of the one or more rechargeable batteries or secondary cells, a manufacturing year for the one or more rechargeable batteries or secondary cells, number of times per day the one or more rechargeable batteries or secondary cells are connected to the charging device, an amount of time per day the one or more rechargeable batteries or secondary cells are connected to the charging device, an amount of time to increase a power level within the one or more rechargeable batteries or secondary cells by one percent, and/or an amount of time needed for the power level within the one or more rechargeable batteries or secondary cells to drop by one percent.

According to any one of the previous aspects of the disclosure, wherein the method further comprises the steps of analyzing said data transmitted to the cloud-based server, assigning the one or more rechargeable batteries or secondary cells with a health level based on the data analyzed by the cloud-based server, and/or transmitting a message to the charging device and/or a device utilizing the one or more rechargeable batteries or secondary cells indicating that the one or more rechargeable batteries or secondary cells need to be replaced According to any one of the previous aspects of the disclosure, wherein the method further comprises the steps of providing one or more additional semiconductor devices within the charging device and identifying a failure within the one or more semiconductor devices of the charging device. The failure identified may be based on a determination that the amount of power is being transmitted through the one or more semiconductor devices after the one or more computing or control devices have instructed the one or more semiconductor devices to prevent the transmission of power to the one or more rechargeable batteries or secondary cells. Once the failure has been identified, an instruction may be sent to the one or more additional semiconductor devices to prevent the transmission of power from the external power source to the one or more rechargeable batteries or secondary cells.

A charging device having a housing with a first end portion, a second end portion, and a hollow interior portion. One or more computing or control devices and/or one or more semiconductor devices may be disposed within said housing of the charging device. At least a portion of the one or more semiconductor devices may be in electrical communication with at least a portion of an external power source and at least a portion of one or more rechargeable batteries or secondary cells. The one or more semiconductor devices may be operably configured to selectively allow for the transmission of an amount of power from the external power source to the one or more rechargeable batteries of secondary cells.

According to the previous aspect of the disclosure, the charging device may further include a first transmitter and receiver. The first transmitter and receiver may be operably configured to wirelessly communicate with a second transmitter and receiver within a device incorporating the one or more rechargeable batteries or secondary cells.

According to any one of the previous aspects of the disclosure, the charging device may further include a user interface in communication with at least a portion of the one or more computing or control devices. At least a portion of the user interface may be received and/or retained within at least a portion of the housing of the charging device. The user interface may be operably configured in order to allow the user to input one or more wake-up times and/or to select a charging mode.

According to any one of the previous aspects of the disclosure, the charging device may further include one or more first power ports and/or one or more second power ports. The one or more first power ports may provide an electrical connection between the one or more rechargeable batteries or secondary cells and the one or more semiconductor devices and the one or more second power ports may provide an electrical connection between the external power source and the one or more semiconductor devices. The one or more first power ports may include a power port switch and/or a power port semiconductor device that are operably configured selectively prevent the transmission of power from the external power source to the one or more rechargeable batteries or secondary cells when a failure is detected within the one or more semiconductor devices. Additionally, the one or more second power ports may include an additional power port switch and/or an additional power port semiconductor device that are operably configured to selectively prevent the transmission of power from the external power source to the one or more rechargeable batteries or secondary cells when a failure is detected within the one or more semiconductor devices.

According to any one of the previous aspects of the disclosure, the charging device may further include one or more first transmission lines. The one or more first transmission lines may include a first line, a second line, a third line, and/or a fourth line. The first line may be a ground wire line and the second line may be a power transmission line. At least a portion of the second line may be connected to at least a portion of a first terminal and a second terminal of the one or more semiconductor devices. The third line and the fourth line may be data transfer lines. At least a portion of the third and fourth lines may be in communication with the one or more computing or control devices and a device incorporating the one or more rechargeable batteries or secondary cells therein.

According to any one of the previous aspects of the disclosure, the charging device may further include a wireless power transfer device. The wireless power transfer device may include one or more primary coil lines having a first end portion, a second end portion, and an intermediate portion interposed between the first and second end portions. At least a portion of the first end portion of the one or more primary coil lines may be connected to at least a portion of one or more first transmission lines allowing for the transfer of power from the external power source to the one or more semiconductor devices at a location between the external power source and the one or more semiconductor devices. Additionally, at least a portion of the second end portion of the one or more primary coil lines may be connected to at least a portion of the one or more semiconductor devices and at least a portion of the intermediate portion of the one or more primary coil lines may include one or more coils forming one or more primary coils. The one or more primary coils of the wireless power transfer device may be operably configured to interact with one or more secondary coils that are in electrical communication with the one or more rechargeable batteries or secondary cells to charge them.

According to any one of the previous aspects of the disclosure, at least a portion of the wireless power transfer device may be received and/or retained within the housing of the charging device.

According to any one of the previous aspects of the disclosure, the wireless power transfer device may further include one or more sensors and/or a third transmitter and receiver. The one or more sensors of the wireless transfer device may be operably configured to determine if an amount of power is being transferred from the one or more semiconductor devices through the one or more primary coils of the wireless power transfer device. The third transmitter and receiver may be in communication with a first transmitter and receiver of the charging device and/or a second transmitter and receiver within a device incorporating the one or more rechargeable batteries or secondary cells therein. Additionally, the first transmitter and receiver may be in communication with the one or more computing or control devices of the charging device and the second transmitter and receiver may be in communication with one or more additional computing or control devices within the device having said one or more rechargeable batteries or secondary cells therein.

According to any one of the previous aspects of the disclosure, the one or more semiconductor devices are one or more transistors.

According to any one of the previous aspects of the disclosure, at least a portion of the one or more rechargeable batteries or secondary cells may be incorporated within a device. The device may be a mobile computing device, mobile phone, cellular phone, satellite phone, computer, laptop, tablet computing device, music player, video player, digital camera, portable gaming device, video camera, drone, virtual reality headset, augmented reality headset, mixed reality headset, video game controller, power tool, remote controlled vehicle, vehicle, and/or automobile.

BRIEF DESCRIPTION OF THE DRAWINGS

The above, as well as other advantages of the present disclosure, will become readily apparent to those skilled in the art from the following detailed description when considered in light of the accompanying drawings in which.

SUMMARY OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Additionally, it is within the scope of this disclosure, and as a non-limiting example, that the method and apparatus for reducing battery stress disclosed herein may be used in mobile device, solar power, battery pack, generator, power bank, power station, portable power station, automotive, construction, marine, aerospace, locomotive, military, machinery, robotic, and/or consumer product applications.

Figure 1:
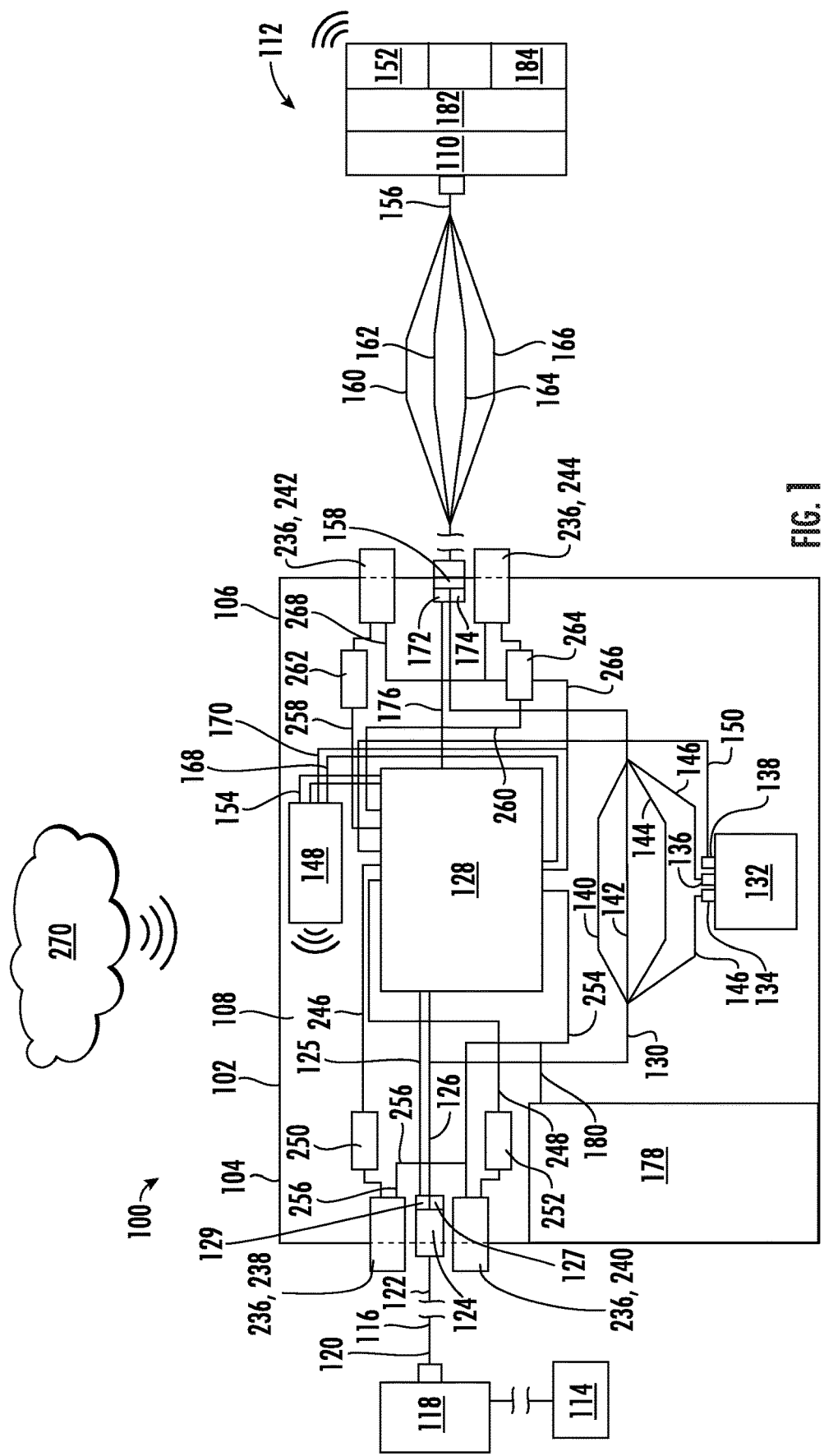
FIG. 1 is schematic top-plan view of a charging device according to an embodiment of the disclosure.
Figure 2:
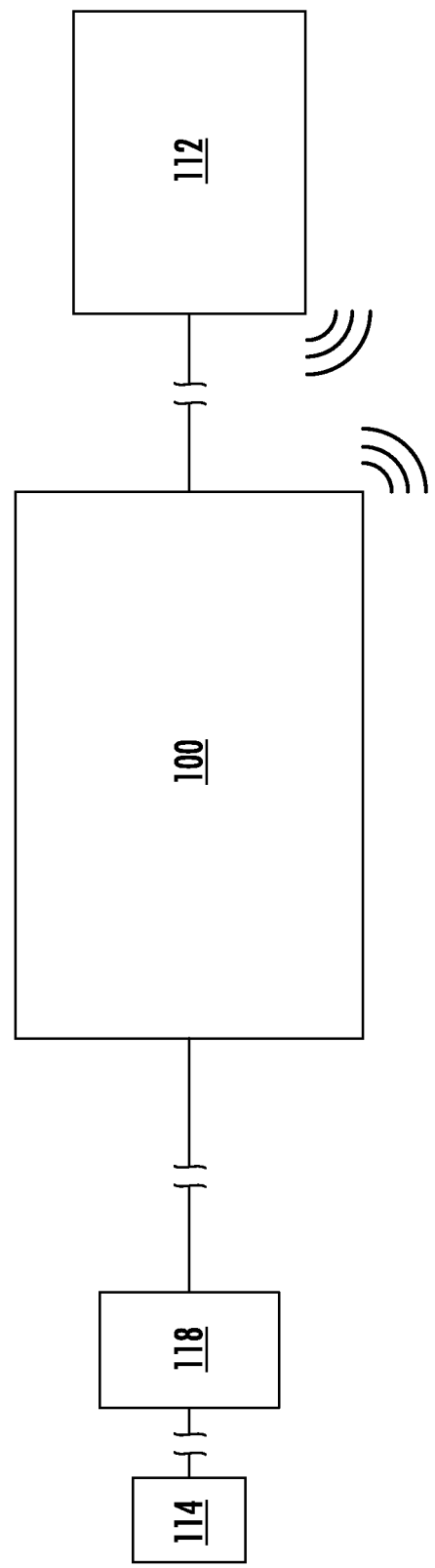
FIG. 2 is schematic top-plan view of the charging device according to the embodiment illustrated in FIG. 1 of the disclosure.

FIGS. 1 and 2 provide a schematic illustration of charging device 100 according to an embodiment of the disclosure. As illustrated in FIG. 1 of the disclosure and as a non-limiting example, the charging device 100 includes a housing 102 having a first end portion 104, a second end portion 106, and a hollow interior portion 108 therein. The charging device 100 may be operably configured to selectively provide or to selectively supply one or more rechargeable batteries or secondary cells 110 with an amount of power to be stored therein for later use. It is within the scope of this disclosure and as a non-limiting example that the one or more rechargeable batteries or secondary cells 110 may form at least a portion of a power bank, a battery pack, portable power station, and/or a battery bank. As a result, it is within the scope of this disclosure and as a non-limiting example that the one or more rechargeable batteries or secondary cells 110 may be wired to work as a single large battery at a pre-determined voltage and amp-hour capacity to supply an amount of power as needed to run and/or operate one or more devices (not shown).

In accordance with the embodiment illustrated in FIG. 1 of the disclosure and as a non-limiting example, the one or more rechargeable batteries or secondary cells 110 may be incorporated into a device 112. As a non-limiting example, the device 112 may be a mobile computing device, mobile phone, cellular phone, satellite phone, computer, laptop, tablet computing device, music player, video player, digital camera, portable gaming device, video camera, drone, virtual reality headset, augmented reality headset, mixed reality headset, video game controller, power tool, remote controlled vehicle, vehicle, automobile, and/or any other type of device that is powered by one or more rechargeable battery or a secondary cells 110.

As best seen in FIG. 1 and as a non-limiting example, the charging device 100 may also be in electrical communication with an external source of power 114. The external power source 114 may be operably configured to provide the one or more rechargeable batteries or secondary cells 110 with the amount of power to be stored therein for later use through the charging device 100. It is within the scope of this disclosure and as a non-limiting example that the external source of power 114 may be one or more solar cells, a generator, a wall outlet, power bank, a battery pack, portable power station, and/or a battery bank. As a result, it is within the scope of this disclosure and as a non-limiting example that the external source of power 114 may be wired to work as a single large battery at a pre-determined voltage and amp-hour capacity to supply an amount of power to the one or more rechargeable batteries or secondary cells 110 to be stored therein for later use.

In accordance with the embodiment illustrated in FIG. 1 and as a non-limiting example, the charging device 100 may be selectively in electrical communication with the external source of power 114. As illustrated in FIG. 1 and as a non-limiting example, one or more second transmission lines 116 may be in electrical communication with one or more adapters 118 that allow the transmission of an amount of electrical energy from the external source of power 114 to the one or more second transmission lines 116 and to the charging device 100. It is within the scope of this disclosure and as a non-limiting example that the one or more second transmission lines 116 may be one or more power transmission cables, one or more Universal Serial Bus (USB) cables, one or more lightening interface cables, one or more Fire-Wire interface cables, one or more IEEE 1394 interface cables, and/or one or more Thunderbolt interface cables.

At least a portion of a first end portion 120 of the one or more second transmission lines 116 may be in electrical communication with at least a portion of the one or more adapters 118. Additionally, at least a portion of a second end portion 122 of the one or more second transmission lines 116 may be in electrical communication with at least a portion of the charging device 100. In accordance with the embodiment illustrated in FIG. 1 and as a non-limiting example, at least a portion of the second end portion 122 of the one or more second transmission lines 116 may extend into at least a portion of the first end portion 104 of the housing 102 and into the hollow interior portion 108 of the housing 102 of the charging device 100 to provide the electrical connection between the external source of power 114 and the charging device 100.

While the embodiment illustrated in FIG. 1 illustrates the charging device 100 being selectively in electrical communication with the external source of power 114, it is within the scope of this disclosure and as a non-limiting example that the charging device 100 may be directly wired to or hard wired into the external source of power 114.

According to the embodiment illustrated in FIG. 1 and as a non-limiting example, at least a portion of the second end portion 122 of the one or more second transmission lines 116 may be in electrical communication with one or more second power ports 124. The one or more second power ports 124 allows for the transmission of an amount of power from the one or more second transmission lines 116 charging device 100. It is within the scope of this disclosure and as a non-limiting example that the one or more second power ports 124 may be one or more three prong adapters, one or more two prong adapters, one or more lightening adapters, one or more USB adapters, one or more FireWire adapters, one or more IEEE 1394 adapters, and/or one or more Thunderbolt adapters.

While the embodiment illustrated in FIG. 1 illustrates the charging device 100 being selectively in electrical communication with the one or more second transmission lines 116, it is within the scope of this disclosure and as a non-limiting example that the charging device 100 may be directly wired to or hard wired into the one or more second transmission lines 116.

Extending from an end of the one or more second power ports 124 is one or more third transmission lines 126. An end of the one or more third transmission lines 126, opposite the external source of power 114 may be in electrical communication with at last a portion of one or more computing or control devices 128. As a result, it is therefore to be understood that the one or more third transmission lines 126 may be used to supply the various components of the charging device 100 with the power needed to allow their operation. The one or more computing or control devices 128 may be operably configured to send and/or receive the data, messages, and/or instructions needed to control the operation of the charging device 100 according to the method described and illustrated herein. It is within the scope of this disclosure and as a non-limiting example that the one or more computing or control devices 128 may be one or more open source single-board computers, one or more Raspberry Pi single-board computers, one or more BeagleBoard single-board computers, one or more Rascal single-board computers, one or more Banana Pi single-board computers, one or more Asus Tinker Board single-board computers, one or more Arduino Uno micro-controllers, one or more Arduino Leonardo micro-controllers, one or more printed circuit boards, one or more mother boards, one or more circuit boards, and/or any other type of device capable of performing the method disclosed herein.

At least a portion of the one or more third transmission lines 126 may be in electrical communication with at least a portion of one or more first transmission lines 130. According to the embodiment illustrated in FIG. 1 and as a non-limiting example, at least a portion of an end of the one or more first transmission lines 130 may be in electrical communication with the one or more third transmission lines 126 at a location between the one or more second power ports 124 and the one or more computing or control devices 128. The one or more first transmission lines 130 allow for the transmission of an amount of power from the external source of power 114 to one or more semiconductor devices 132. The one or more semiconductor devices 132 may be operably configured to selectively allow for the transmission of an amount of power from the external source of power 114, through the charging device 100, and to the one or more rechargeable batteries or secondary cells 110 to be stored therein for use. It is within the scope of this disclosure and as a non-limiting example that the one or more semiconductor device 132 may be operably configures in order to allow a variable amount of power to be transferred from the external source of power 114 to the one or more rechargeable batteries or secondary cells 110. As a non-limiting example, the one or more semiconductor devices 132 may be one or more transistors.

In accordance with the embodiment illustrated in FIG. 1 and as a non-limiting example, the one or more first transmission lines 130 may include a first line 140, a second line 146, a third line 142, and/or a fourth line 144. It is within the scope of this disclosure and as a non-limiting example that the first line 140 may be a ground and the second line 146 may be a power transmission line that is capable of transmitting an amount of power from the external source of power 114 to the one or more rechargeable batteries or secondary cells 110. Additionally, it is within the scope of this disclosure and as a non-limiting example that the third line 142 and/or the fourth line 144 may be data transmission lines capable of selectively transmitting information between the charging device 100, the one or more rechargeable batteries or secondary cells 110, and/or the device 112.

As illustrated in FIG. 1 and as a non-limiting example, the one or more semiconductor devices 132 may include a first terminal 134, a second terminal 136, and/or a third terminal 138. At least a portion of the second line 146 of the one or more first transmission lines 130 may be in electrical communication with at least a portion of the first and second terminals 134 and 136 of the semiconductor device. It is therefore to be understood that the first terminal 134 of the one or more semiconductor devices 132 may be a power-in terminal that receives an amount of power from the external source of power 114 and the second terminal 136 of the one or more semiconductor devices 132 may be a power-out terminal that supplies an amount of power to the one or more rechargeable batteries or secondary cells 110.

According to the embodiment illustrated in FIG. 1 and as a non-limiting example, at least a portion of a first transmitter and receiver 148 may be in communication with the one or more computing or control devices 128 of the charging device 100 by a first line 154. Additionally, as illustrated in FIG. 1 and as a non-limiting example, at least a portion of the one or more computing or control devices 128 may then be in communication with the one or more semiconductor devices 132 by connecting at least a portion of an end of a control line 150 opposite the one or more computing or control devices 128 to the third terminal 138 of the one or more semiconductor devices 132. The first transmitter and receiver 148 may be in communication with a second transmitter and receiver 152 of the device 112 thereby allowing for the communication of information and/or data between the charging device 100 and the device 112. It is within the scope of this disclosure and as a non-limiting example that the first and second transmitters and receivers 148 and 152 may be capable of transmitting and/or receiving messages and/or signals wirelessly via a Wi-Fi connection, a Bluetooth connection, an electromagnetic wave connection, a cellular connection, a radio wave connection and/or any other type of communication that does not require a wired connection.

In accordance with an embodiment of the disclosure and as a non-limiting example, the charging device 100 may be in electrical communication with the one or more rechargeable batteries or secondary cells 110 by using the one or more first transmission lines 130. As a result, it is therefore to be understood that an end of the one or more first transmission lines 130 opposite the charging device 100 may be selectively connectable and disconnectable to at least a portion of the one or more rechargeable batteries or secondary cells 110.

In accordance with an alternative embodiment of the disclosure and as a non-limiting example, the charging device 100 may be in electrical communication with the one or more rechargeable batteries or secondary cells 110 by one or more fourth transmission lines 156. As illustrated in FIG. 1 and as a non-limiting example, one end of the one or more fourth transmission lines 156 are in electrical communication with the charging device 100 and an end of the one or more fourth transmission lines 156, opposite the charging device 100, is in electrical communication with the one or more rechargeable batteries or secondary cells 110. It is within the scope of this disclosure and as a non-limiting example that the end of the one or more fourth transmission lines 156, opposite the one or more rechargeable batteries or secondary cells 110, may be in electrical communication with one or more first power ports 158. As a non-limiting example, the one or more first power ports 158 may be one or more three prong adapters, one or more two prong adapters, one or more lightening adapters, one or more USB adapters, one or more FireWire adapters, one or more IEEE 1394 adapters, one or more Thunderbolt adapters and/or any other type of connection that is capable of facilitating the transmission of information, data, and/or power between the charging device 100 and the device 112.

As best seen in FIG. 1 and as a non-limiting example, at least a portion of the one or more semiconductor devices 132 may be in electrical communication with at least a portion of the one or more first and second power ports 124 and 158 of the charging device 100. It is therefore to be understood that at least a portion of the one or more semiconductor devices 132 may be interposed between the one or more first and second power ports 124 and 158 of the charging device 100.

According to the embodiment illustrated in FIG. 1 and as a non-limiting example, the one or more fourth transmission lines 156 may include a first line 160, a second line 162, a third line 164, and/or a fourth line 166. It is within the scope of this disclosure and as a non-limiting example that the first line 160 may be a ground and the second line 162 may be a power transmission line that is capable of transmitting an amount of power from the one or more semiconductor devices 132 of the charging device 100 to the one or more rechargeable batteries or secondary cells 110. Additionally, it is within the scope of this disclosure and as a non-limiting example that the third line 164 and/or the fourth line 166 may be data transmission lines capable of selectively transmitting information between the charging device 100, the one or more rechargeable batteries or secondary cells 110, and/or the device 112. In light of the foregoing, it is therefore to be understood that at least a portion of the first line 140, the second line 146, the third line 142, and the fourth line 144 of the one or more first transmission lines 130 may be in communication with at least a portion of the first line 160, the second line 162, the third line 164, and the fourth line 166 of the one or more fourth transmission lines 156 respectively.

The first transmitter and receiver 148 may also include a second line 168 and/or a third line 170. At least a portion of one end of the first and/or second lines 168 and/or 170 may be in communication with the first transmitter and receiver 148 and at least a portion of an end of the first transmitter and receiver 148, opposite the first transmitter and receiver 148, may be in communication with at least a portion of the one or more computing or control devices 128. It is within the scope of this disclosure and as a non-limiting example that the first line 168 may be a ground and the second line 170 may be a power transmission line that is capable of transmitting an amount of power delivered to the one or more computing or control devices 128 needed to operate and run the first transmitter and receiver 148 of the charging device 100.

It is within the scope of this disclosure and as a non-limiting example that the one or more computing or control devices 128 may be operably configured to identify or monitor, either continuously or at pre-determined intervals, the amount of power being delivered from the external source of power 114 to the charging device 100. The amount of power being delivered from the external source of power 114 may be determined based on the amount of power transmitted through the one or more third transmission lines 126 to the one or more computing or control devices 128 of the charging device 100. This data collected and analyzed by the one or more computing or control devices 128 may be utilized as a safety feature to aid in preventing damage to the charging device 100, the one or more rechargeable batteries or secondary cells 110, and/or the device 112, the one or more computing or control devices 128 via a power surge.

If the charging device 100 identifies or determines that the amount of power being transmitted from the external source of power 114 is of a level that could damage the charging device 100, the one or more rechargeable batteries or secondary cells 110, and/or the device 112, the one or more computing or control devices 128 may be operably configured to stop or prevent the external source of power 114 from transmitting power to the charging device 100, the one or more computing or control devices 128, the one or more semiconductor devices 132, the one or more rechargeable batteries or secondary cells 110, and/or the device 112. As a non-limiting example, this may be achieved by the one or more computing or control devices 128 communicating with the one or more second power ports 124 over a power port control line 125 that electrically disconnects the external source of power 114 from the one or more third transmission lines 126. As a non-limiting example the one or more second power ports 124 may include an additional power port switch 127 and/or an additional power port semiconductor device 129 that are controlled by the one or more computing or control devices 128 to selectively allow the transmission of power from the external source of power 114 to the one or more computing or control devices 128 and/or the one or more semiconductor devices 132 of the charging device 100. It is therefore to be understood that at least a portion of the additional power port switch 127 and/or the additional power port semiconductor device 129 may be connected to and in communication with the power port control line 125 of the charging device 100. It is within the scope of this disclosure and as a non-limiting example that the additional power port semiconductor device 129 may be one or more transistors.

As a further safety feature, the one or more first power ports 158 of the charging device 100 may include a power port switch 172 and/or a power port semiconductor device 174. The power port switch 172 and/or the power port semiconductor device 174 may be operably configured in order to selectively allow the transmission of an amount of power from the charging device 100 to the one or more rechargeable batteries or secondary cells 110 and/or the device 112. As illustrated in FIG. 1 and as a non-limiting example, the power port switch 172 and/or the power port semiconductor device 174 may be connected to and/or in communication with at least a portion of the one or more computing or control devices 128 by using an additional power port control line 176. It is within the scope of this disclosure and as a non-limiting example that the power port semiconductor device 174 may be one or more transistors.

If the one or more computing or control devices 128 identify a failure within the charging device 100 and/or that the amount of power being transmitted from the external source of power 114 is of a level that could damage the charging device 100, the one or more rechargeable batteries or secondary cells 110, and/or the device 112, the one or more computing or control devices 128, the one or more computing or control devices 128 may instruct the power port switch 172 and/or the power port semiconductor device 174 to stop or prevent the transmission of power from the charging device to the one or more rechargeable batteries or secondary cells 110 and/or the device 112. As a non-limiting example, the failure detected or identified by the one or more computing or control devices 128 may be a failure within the one or more second power ports 124, the additional power port switch 127, the additional power port semiconductor device 129, and/or the one or more semiconductor devices 132 of the charging device 100. A failure within the one or more second power ports 124, the additional power port switch 127, and/or the additional power port semiconductor device 129 may be determined based on the one or more computing or control devices 128 identifying the transmission of the damaging amount of power from the external source of power 114; confirming that the one or more computing or control devices 128 instructed the additional power port switch 127 and/or the additional power port semiconductor device 129 to prevent the transmission of power from the external source of power 114 to the charging device 100; and/or identifying or detecting an amount of power being transmitted to the one or more computing or control devices 128 and/or the one or more semiconductor devices 132. A failure within the one or more semiconductor devices 132 may be determined based on the one or more computing or control devices 128 identifying an amount of power being transmitted through the one or more semiconductor devices 132 when otherwise instructed by the one or more computing or control devices 128 to prevent or stop the flow of power through the one or more semiconductor devices 132. This may be determined by the one or more computing or control devices 128 by identifying or detecting an amount of power within the one or more first power ports 158, the power port switch 172, and/or the power port semiconductor device 174 via the additional power port control line 176.

In order to utilize the charging device 100 described and illustrated herein, a user (not shown) may interact with the charging device 100 and/or the device 112 in order to select a charging mode for the one or more rechargeable batteries or secondary cells 110. Additionally, the user (not shown) may interact with the charging device 100 and/or the device 112 in order to input the information or data needed for the charging device to perform the charging mode selected. It is therefore within the scope of this disclosure and as a non-limiting example that all operation may be directed through the charging device 100, that all of the operation may be directed through the device 112, and/or operation may be split between the charging device 100 and the device 112.

According to the embodiment where the user (not shown) interacts with the charging device 100 to select the desired charging mode, the charging device 100 may include a charger user interface 178 that is in communication with the one or more computing or control devices 128 by using one or more charger user interface lines 180. As a non-limiting example, the one or more charger user interface lines 180 of the charger user interface 178 may be operably configured to provide the power needed to operate the charger user interface 178 and/or may be operably configured facilitate the communication of information and/or data between the charger user interface 178 and the one or more computing or control devices 128 of the charging device 100 for operation thereof according to an embodiment of the disclosure. It is within the scope of this disclosure and as a non-limiting example that the charger user interface 178 of the charging device 100 may include a touch screen interface, a non-touch screen interface, one or more buttons, one or more switches, one or more joy-sticks, one or more depressible joy-sticks, one or more scroll wheels, one or more depressible scroll wheels, and/or any other combination of devices capable of allowing the user (not shown) to input data and select a charging mode.

In accordance with the embodiment where the user (not shown) interacts with the device 112 to select the desired charging mode, the device 112 may include a device user interface 182 that is in communication with one or more additional computing or control devices 184. The device user interface 182 may be operably configured in order to allow the user to select the desired charging mode and/or may be operably configured in order to allow the user (not shown) to input the information and/or data needed to perform the charging mode selected by the user (not shown). It is within the scope of this disclosure and as a non-limiting example that the device user interface 182 of the device 112 may include a touch screen interface, a non-touch screen interface, one or more buttons, one or more switches, one or more j oy-sticks, one or more depressible joy-sticks, one or more scroll wheels, one or more depressible scroll wheels, and/or any other combination of devices capable of allowing the user (not shown) to input data and select a charging mode. It is therefore within the scope of this disclosure and as a non-limiting example that the control logic or program needed to operate the charging device may be natively installed within the operating system of the device 112 or installed as an application onto the device 112.

Figure 3:
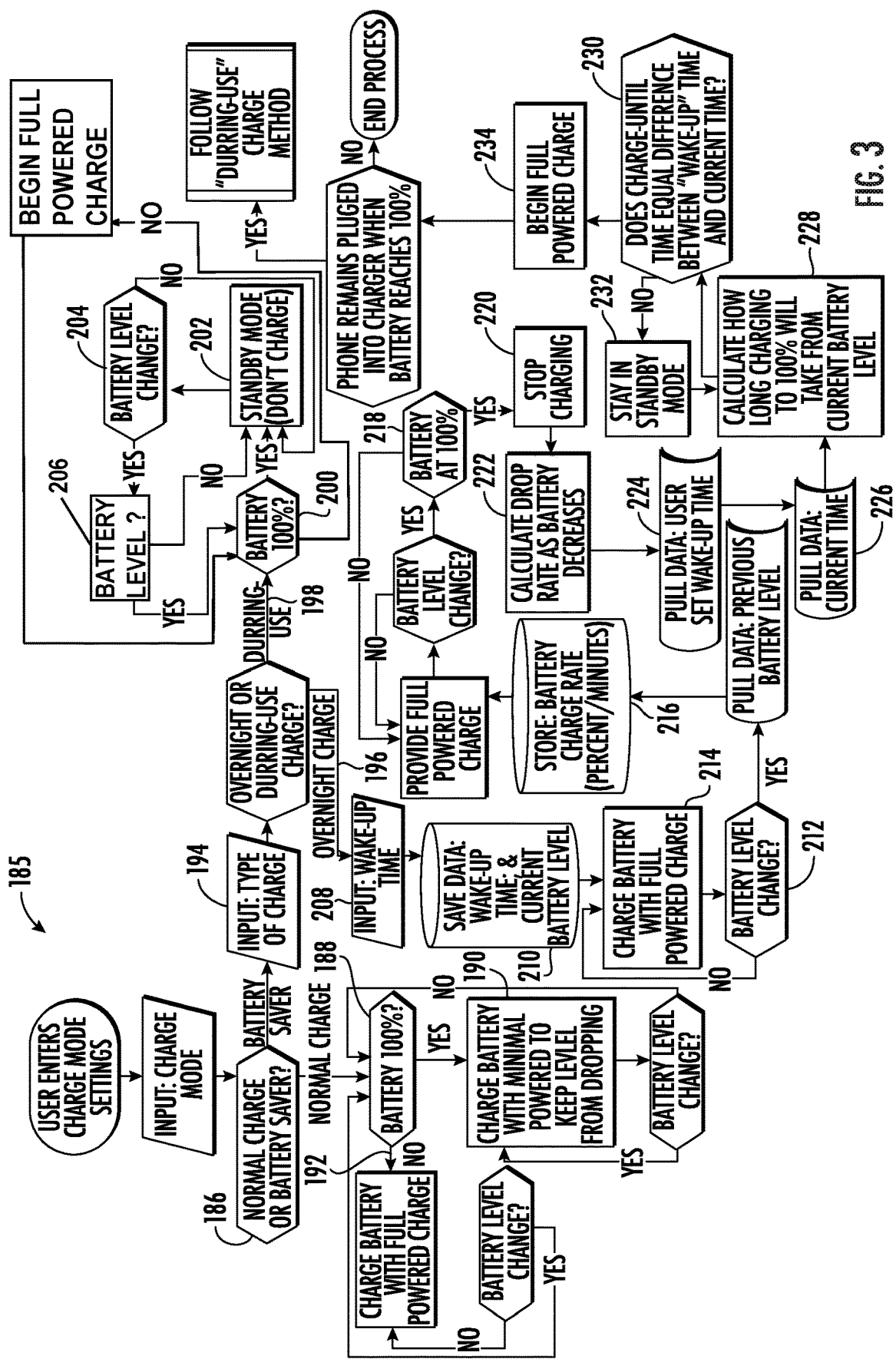
FIG. 3 is a flow-chart illustrating the methods of operating the charging device illustrated in FIGS. 1 and 2 of the disclosure.

FIG. 3 of the disclosure sets forth a flow chart illustrating a method 185 of charging one or more rechargeable batteries or secondary cells 110 according to an embodiment of the disclosure. As best seen in FIG. 3 of the disclosure and as a non-limiting example, the user (not shown) may first select whether they would like to charge the one or more rechargeable batteries or secondary cells 110 using a "normal charging" mode of operation or by using a "battery saver" mode of operation 186. In the event that the user (not shown) selects the "normal charging" mode of operation for the charging device 100, the current power level of the one or more rechargeable batteries or secondary cells 110 needs to be determined 188. It is within the scope of this disclosure and as a non-limiting example that the current power level of the one or more rechargeable batteries or secondary cells 110 may be determined by the one or more computing or control devices 128 and/or by the one or more additional computing or control devices 184 of the device 112. According to the embodiment where the one or more additional computing or control devices 184 of the device 112 determine the current power level of the one or more rechargeable batteries or secondary cells 110, the power level information may be communicated from the device 112 to the one or more computing or control devices 128 of the charging device 100 by utilizing the first and second transmitters and receivers 148 and 152 and/or by utilizing the data transmission lines 164 and/or 166 of the one or more fourth transmission lines 156 and the data transmission lines 140 and/or 142 of the one or more first transmission lines 130. In accordance with the embodiment where the one or more additional computing or control devices 184 of the device 112 determine the current power level of the one or more rechargeable batteries or secondary cells 110, the one or more additional computing or control devices 184 may continuously monitor and supply the one or more computing or control devices 128 with the power lever of the one or more rechargeable batteries or secondary cells 110 and/or may monitor and supply the one or more computing or control devices 128 with the power lever of the one or more rechargeable batteries or secondary cells 110 at pre-determined intervals.

If the current power level of the one or more rechargeable batteries or secondary cells 110 is determined to be 100%, the one or more computing or control devices 128 of the charging device 100 will provide the one or more rechargeable batteries or secondary cells 110 with micro charge 190. The micro charge may be an amount of power needed to keep the one or more rechargeable batteries or secondary cells 110 at full 100% charge at all times while connected to the charging device 100. It is within the scope of this disclosure and as a non-limiting example that the micro charge may be determined by identifying the amount of power needed to charge the one or more rechargeable batteries or secondary cells 110, at their current health, 1% within a per-determined time interval. As a result, the micro charge supplied 190 to the one or more rechargeable batteries or secondary cells 110 may be a pre-determined percentage of power needed in order to ensure that the one or more rechargeable batteries or secondary cells 110 remain at or near full charge (or 100%) at all times until disconnected from the charging device 100.

In the event that the current power level of the one or more rechargeable batteries or secondary cells 110 are not at or near full charge (or 100%), the charging device 100 will supply the one or more rechargeable batteries or secondary cells 110 with the power needed to bring the power level within the one or more rechargeable batteries or secondary cells 110 back to full charge (or 100%) 192. Once the power level within the one or more rechargeable batteries or secondary cells 110 has reached full charge (or 100%) the charging device 100 will then instruct the one or more computing or control devices 128 of the charging device 100 will instruct the charging device 100 to supply the one or more rechargeable batteries or secondary cells 110 with the micro charge 190.

If the user (not shown) selects the "battery saver" charging option, then the user will be instructed to choose between a battery saver charging method type 194. It is within the scope of this disclosure and as a non-limiting example that the user (not shown) may be allowed to select from an overnight charging mode 196 and/or a during use charging mode 198.

In the event that the user (not shown) selects the during use charging mode 198, the current power level of the one or more rechargeable batteries or secondary cells 110 is determined by the one or more additional computing or control devices 184 of the device 112 and/or the one or more computing or control devices 128 of the charging device 100. If the current power lever of the one or more rechargeable batteries or secondary cells 110 is at full charge (or 100%) 200, the one or more computing or control devices 128 may place the charging device 100 in a standby mode 202. In the standby mode 202, the one or more computing or control devices 128 may instruct the one or more semiconductor devices 132 to stop supplying the one or more rechargeable batteries or secondary cells 110 with power.

While in the standby mode 202, the one or more computing or control devices 128 of the charging device 100 and/or the one or more computing or control devices 128 of the charging device 100 may continuously monitor, or may monitor at pre-determined intervals, the power level of the one or more rechargeable batteries or secondary cells 110 over time 204.

Once the power level within the one or more rechargeable batteries or secondary cells 110 falls below a pre-determined threshold 206, the one or more computing or control devices 128 may instruct the one or more semiconductor devices 132 to supply the one or more rechargeable batteries or secondary cells 110 with the amount of power needed and for the amount of time needed to bring the power level within the one or more rechargeable batteries or secondary cells 110 back to full charge (or 100%). It is within the scope of this disclosure and as a non-limiting example, that the pre-determined threshold may be established by the programming of the charging device or may be selected or provided to the one or more computing or control devices 128 by the user (not shown). As a non-limiting example, the pre-determined threshold 206 may be from approximately 80% to approximately 95% or more particularly from approximately 90% to approximately 95%.

According to an embodiment of the disclosure and as a non-limiting example, the pre-determined threshold 206 may be set within the programming of the charging device 100 or the pre-determined threshold 206 may be set by the user (not shown). In accordance with the embodiment where the pre-determined threshold 206 is set by the user (not shown), the method 185 may further include the steps of requesting the user (not shown) to input a pre-determined minimum threshold 206, the user (not shown) may input the pre-determined minimum threshold 206, and the pre-determined minimum threshold 206 inputted by the user (not shown) is saved for later use. In the event that the power level within the one or more rechargeable batteries or secondary cells 110 falls below the pre-determined minimum threshold 206 inputter by the user (not shown), the one or more computing or control devices 128 may instruct the one or more semiconductor devices 132 to supply the one or more rechargeable batteries or secondary cells 110 with the amount of power needed and for the amount of time needed to bring the power level within the one or more rechargeable batteries or secondary cells 110 back to full charge (or 100%).

Once the power level within the one or more rechargeable batteries or secondary cells 110 back to full charge (or 100%) the one or more computing or control devices 128 will put the charging device in the standby mode 202 previously described. This cycle will continue as long as the one or more rechargeable batteries or secondary cells 110 are connected to the charging device 100 and/or as long as the during use charging mode 198 is selected.

In the event that the user selects the overnight charging mode 196, the user (not shown) will be prompted to input a wake-up time and/or series of wake-up times 208. The wake-up time and/or series of wake-up times 208 may be inputted by the user (not shown) by utilizing the device user interface 182 of the device 112 and/or the charger user interface 178 of the charging device 100. The wake-up time and/or wake-up times entered 208 by the user (not shown) may then be stored 210 within the one or more computing or control devices 128 of the charging device 100 and/or the one or more additional computing or control devices 184 of the device 112 to be utilized. As a non-limiting example, the series of wake-up times 208 may correspond to the desired wake-up time for each day of the week.

In the event that the wake-up time is not entered by the user (not shown), it is within the scope of this disclosure and as a non-limiting example that the one or more computing or control devices 128 of the charging device 100 and/or the one or more additional computing or control devices 184 of the device 112 may predict the wake-up time based on the user's (not shown) wake-up times previously inputted on that given day of the week in the past over a pre-determined amount of time.

Once the wake-up time(s) has been inputted 208 and saved 210, the current power level of the one or more rechargeable batteries or secondary cells 110 may be determined 212 by the one or more additional computing or control devices 184 of the device 112 and/or the one or more computing or control devices 128 of the charging device 100. If the current power level of the one or more rechargeable batteries or secondary cells 110 are not fully charged (or are not at 100%), the one or more computing or control devices 128 may instruct the one or more semiconductor devices 132 to supply the one or more rechargeable batteries or secondary cells 110 with an amount of power needed to fully charge 214 the one or more rechargeable batteries or secondary cells 110.

While the charging device 100 is providing the one or more rechargeable batteries or secondary cells 110 with the amount of power needed to provide a fully charge 214, the amount of power over time needed to increase the overall power within the one or more rechargeable batteries or secondary cells 110 by 1% may be determined and saved 216. This may be determined by the one or more additional computing or control devices 184 of the device 112 and/or the one or more computing or control devices 128 of the charging device 100. It is within the scope of this disclosure and as a non-limiting example that the amount of power over time needed to increase the overall power within the one or more rechargeable batteries or secondary cells 110 by 1% may be determined, saved, and updated over time in order to allow that the functionality of the charging device 100 to adapt to the current health of the one or more rechargeable batteries or secondary cells 110.

Once the one or more rechargeable batteries or secondary cells 110 have been fully charged (or charged to 100%) 218, the one or more computing or control devices 128 of the charging device 100 will instruct the one or more semiconductor devices 132 to stop providing the one or more rechargeable batteries or secondary cells 110 with power. During this time, the one or more additional computing or control devices 184 of the device 112 and/or the one or more computing or control devices 128 of the charging device 100 will monitor continuously, or at pre-determined intervals, the power level of the one or more rechargeable batteries or secondary cells 110 over time. The one or more additional computing or control devices 184 and/or the one or more computing or control devices 128 may then determine the rate in which the one or more rechargeable batteries or secondary cells 110 lose 1% of power thereby determining 222 the amount of time it takes for the one or more rechargeable batteries or secondary cells 110 to lose 1% of their overall power in a non-use state. It is within the scope of this disclosure and as a non-limiting example that the amount of time it takes for the one or more rechargeable batteries or secondary cells 110 to lose 1% of their overall power may be determined, saved, and updated over time in order to allow that the functionality of the charging device 100 to adapt to the current health of the one or more rechargeable batteries or secondary cells 110.

As illustrated in FIG. 3 and as a non-limiting example, the one or more additional computing or control devices 184 of the device 112 and/or the one or more computing or control devices 128 of the charging device 100 may retrieve data 224 and/or 226 relating to the wake-up time(s) saved 210, the current time, and/or the current power level of the one or more rechargeable batteries or secondary cells 110. With this information the one or more additional computing or control devices 184 of the device 112 and/or the one or more computing or control devices 128 of the charging device 100 may determine the amount of time needed to fully charge 228 the one or more rechargeable batteries or secondary cells 110. This calculation may be based on the current power level of the one or more rechargeable batteries or secondary cells 110 and the amount of time needed to raise the overall power level within the one or more rechargeable batteries or secondary cells 110 by 1%. As a non-limiting example, if the one or more rechargeable batteries or secondary cells 110 are at 80% power and it takes 5-minutes to increase the charge within the one or more rechargeable batteries or secondary cells 110 by 1%, it can be determined that it will take 100-minutes to fully charge the one or more rechargeable batteries or secondary cells 110.

Once the amount of time needed to fully charge 228 the one or more rechargeable batteries or secondary cells 110 has been determined, it will then be determined if the amount of time determined 228 is equal to the amount of time until 230 the wake-up time(s) inputted 208 by the user (not shown). This may be determined by the one or more additional computing or control devices 184 of the device 112 and/or the one or more computing or control devices 128 of the charging device 100.

If the amount of time determined 228 is not equal to the amount of time until 230 the wake-up time(s) inputted 208 by the user (not shown), then the one or more computing or control devices 128 will place the charging device 100 in a standby mode 232. In this standby mode 232, the one or more computing or control devices 128 will instruct the one or more semiconductor devices 132 to prevent the transmission of power to the one or more rechargeable batteries or secondary cells 110.

If the amount of time determined 228 is equal to the amount of time until 230 the wake-up time(s) inputted 208 by the user (not shown), then the one or more computing or control devices 128 will instruct the one or more semiconductor devices 132 to supply 234 the one or more rechargeable batteries or secondary cells 110 with the power needed to fully charge the one or more rechargeable batteries or secondary cells 110. This aids in ensuring that the one or more rechargeable batteries or secondary cells 110 are fully charged at the wake-up time(s) inputter 208 without causing undue damage to the one or more rechargeable batteries or secondary cells 110 thereby improving the overall life of the one or more rechargeable batteries or secondary cells 110.

It is also within the scope of this disclosure and as a non-limiting example that the one or more additional computing or control devices 184 of the device 112 and/or the one or more computing or control devices 128 of the charging device 100 may determine if the one or more rechargeable batteries or secondary cells 110 will fall below a pre-determined minimum power threshold before the wake-up charge 234 is applied. This may be determined based on the current time 226, the amount of time needed to fully charge 228 the one or more rechargeable batteries or secondary cells 110, and/or the amount of time it takes for the one or more rechargeable batteries or secondary cells 110 to lose 1% of their overall power 222. In the event that it is determined that the overall power level within the one or more rechargeable batteries or secondary cells 110 will fall below the pre-determined minimum power threshold before the wake-up charge 234 is applied, the one or more computing or control devices 128 may instruct the one or more semiconductor devices 132 to supply the one or more rechargeable batteries or secondary cells 110 with an amount of power. It is within the scope of this disclosure and as a non-limiting example that the amount of power provided may be enough to fully charge the one or more rechargeable batteries or secondary cells 110 or to provide the one or more rechargeable batteries or secondary cells 110 with a partial charge. This aids in preventing the one or more rechargeable batteries or secondary cells 110 from becoming completely depleted thereby further aiding in improving the overall life of the one or more rechargeable batteries or secondary cells 110. As a non-limiting example, the pre-determined minimum power threshold may be from approximately 10% to approximately 30% or more particularly from approximately 20% to approximately 25%.

While the amount of power is provided to the one or more rechargeable batteries or secondary cells 110, the amount of power over time needed to increase the overall power within the one or more rechargeable batteries or secondary cells 110 by 1% may be determined and saved 216. This aids in ensuring that the charging device 100 is adaptive to the current life or health of the one or more rechargeable batteries or secondary cells 110. Once saved, the charging device 100 will enter into the standby mode 220 and steps 222, 224, 226, 228, 230, 232, and/or 234 previously described herein may be performed. This cycle may then be continued until the charging device 100 provides the one or more rechargeable batteries or secondary cells 110 with the wake-up charge 234 described previously herein.

While interacting with the device user interface 182 of the device 112, the user (not shown) may selectively elect to silence or stop the device 112 from emitting a sound relating to the charging of or power level of the one or more rechargeable batteries or secondary cells 110. Additionally, while interacting with the device user interface 182 of the device 112 the user (not shown) may selectively elect to have the device 112 cease generating messages or notifications relating to the charging or power level of the one or more rechargeable batteries or secondary cells 110. This may help prevent the device 112 from waking up or otherwise disturbing the user (not shown) when the device 112 is connected to the charging device 100.

As best seen in FIG. 1 of the disclosure and as a non-limiting example, the charging device 100 may include one or more status indicators 236. The one or more status indicators 236 may be utilized in order to provide the user (not shown) with information relating to the operating condition of the charging device 100, the functional characteristic of the charging device 100, and/or if there is a failure within one or more of the components of the charging device 100. It is within the scope of this disclosure and as a non-limiting example that the one or more status indicators 236 may be one or more light emitting diodes (LEDs).

In accordance with the embodiment illustrated in FIG. 1 and as a non-limiting example, the charging device 100 may include a first status indicator 238, a second status indicator 240, a third status indicator 242, and/or a fourth status indicator 244. As illustrated in FIG. 1 and as a non-limiting example, at least a portion of the first, second, third, and/or fourth status indicators 238, 240, 242, and/or 244 may be disposed within the hollow interior portion 108 of the housing 102 and at least a portion of the first, second, third, and/or fourth status indicators 238, 240, 242, and/or 244 may be disposed outside the housing 102 of the charging device 100. This aids in ensuring that the information provided by the first, second, third, and/or fourth status indicators 238, 240, 242, and/or 244 may be clearly seen by the user (not shown). It is within the scope of this disclosure and as a non-limiting example that the first status indicator 238 may be a red LED indicating that the charging device 100 is receiving power from the external power source 114, the second status indicator 240 may be blue indicating that the device 112 is in communication with the one or more computing or control devices 128, the third status indicator 242 may be green indicating that the charging device 100 is charging the one or more rechargeable batteries or secondary cells 110, and the fourth status indictor 244 may be yellow indicating that the charging device 100 is in a standby mode and power is not being supplied to the one or more rechargeable batteries or secondary cells 110. As a non-limiting example, the first status indicator 238, the second status indicator 240, the third status indicator 242, and/or the fourth status indicator 244 may be LEDs.

In order to provide the power needed to operate the first and second status indicators 238 and 240, the first status indicator 238 may be in connection with the one or more computing or control devices 128 by using one or more first status indicator lines 246 and one or more second status indicator lines 248. As a result, the power transmitted from the external power source 114 may be transmitted from the one or more computing or control devices 128 to the first and second status indicators 238 and 240. It is within the scope of this disclosure and as a non-limiting example that the one or more first and second status indicator lines 246 and 248 may be power-in lines.

According to the embodiment illustrated in FIG. 1 and as a non-limiting example, the charging device 100 may include one or more first resistors 250 and/or one or more second resistors 252. At least a portion of one or more first resistors 250 may be connected to at least a portion of the one or more first status indicator lines 246 at a location between the first status indicator 238 and the one or more computing or control devices 128. Additionally, the one or more second resistors 252 may be connected to at least a portion of the one or more second status indicator lines 248 at a location between the second status indicator 240 and the one or more computing or control devices 128. The one or more first and/or second resistors 250 and/or 252 aid in ensuring that the first and/or second status indicators 238 and/or 240 do not receive an amount of power that would damage the first and/or second status indicators 238 and/or 240 which aids in increasing the overall life of the first status indicator 238, the second status indicator 240, and/or the charging device 100.

As best seen in FIG. 1 and as a non-limiting example, the charging device 100 may include one or more third status indicator lines 254 and/or one or more fourth status indicator lines 256. At least a portion of an end of the one or more third status indicator lines 254 may be connected to at least a portion of the one or more computing or control devices 128 and at least a portion of an opposite end is connected to at least a portion of the second status indicator 240. Additionally, at least a portion of an end of the one or more fourth status indicator lines 256 may be connected to at least a portion of the first status indicator 238 and at least a portion of an opposite end may be connected to at least a portion of the one or more third status indicator lines 254 at a location between the second status indicator 240 and the one or more computing or control devices 128. It is within the scope of this disclosure and as a non-limiting example that the one or more third and/or fourth status indicator lines 254 and/or 256 may be power-out lines. In order to provide the power needed to operate the third and fourth status indicators 242 and 244, the third status indicator 242 may be in connection with the one or more computing or control devices 128 by using one or more fifth status indicator lines 258 and one or more sixth status indicator lines 260. As a result, the power transmitted from the external power source 114 may be transmitted from the one or more computing or control devices 128 to the third and fourth status indicators 242 and 244. It is within the scope of this disclosure and as a non-limiting example that the one or more fifth and sixth status indicator lines 258 and 260 may be power-in lines.

According to the embodiment illustrated in FIG. 1 and as a non-limiting example, the charging device 100 may include one or more third resistors 262 and/or one or more fourth resistors 264. At least a portion of one or more third resistors 262 may be connected to at least a portion of the one or more fifth status indicator lines 258 at a location between the third status indicator 242 and the one or more computing or control devices 128. Additionally, the one or more fourth resistors 264 may be connected to at least a portion of the one or more sixth status indicator lines 260 at a location between the fourth status indicator 244 and the one or more computing or control devices 128. The one or more third and/or fourth resistors 262 and/or 264 aid in ensuring that the third and/or fourth status indicators 242 and/or 244 do not receive an amount of power that would damage the third and/or fourth status indicators 242 and/or 244 which aids in increasing the overall life of the third status indicator 242, the fourth status indicator 244, and/or the charging device 100.

As best seen in FIG. 1 and as a non-limiting example, the charging device 100 may include one or more seventh status indicator lines 266 and/or one or more eighth status indicator lines 268. At least a portion of an end of the seventh status indicator lines 266 may be connected to at least a portion of the one or more computing or control devices 128 and at least a portion of an opposite end is connected to at least a portion of the fourth status indicator 244. Additionally, at least a portion of an end of the one or more eighth status indicator lines 268 may be connected to at least a portion of the third status indicator 242 and at least a portion of an opposite end may be connected to at least a portion of the one or more seventh status indicator lines 266 at a location between the fourth status indicator 244 and the one or more computing or control devices 128. It is within the scope of this disclosure and as a non-limiting example that the one or more seventh and/or eighth status indicator lines 266 and/or 268 may be power-out lines.

In accordance with an embodiment of the disclosure and as a non-limiting example, the charging device 100 and/or the device 112 may be in wireless communication with a cloud-based server 270. As a non-limiting example, the one or more additional computing or control devices 184 of the device 112 and/or the one or more computing or control devices 128 of the charging device 100 may collect data relating to the type of the make, model, and model year (or manufacturing year) of the one or more rechargeable batteries or secondary cells 110. This may be determined based on user inputted data and/or may be determined based on manufacturer provided data relating to the make, model, and model year of the device 112 that utilizes the one or more rechargeable batteries or secondary cells 110. As a non-limiting example, the manufacturer data relating to the one or more rechargeable batteries or secondary cells 110 may be determined by the one or more additional computing or control devices 184 of the device 112 and/or the cloud-based server accessing a device battery database created.

The one or more computing or control devices 128 and/or the one or more additional computing or control devices 184 may collect the data relating to the make, model, and model year of the one or more rechargeable batteries or secondary cells 110 and instruct the first transmitter and receiver 148 and/or the second transmitter and receiver 152 transmit it wirelessly to the cloud-based server 270. In order to ensure that the charging device 100 is a secure as possible, only information relating to the one or more rechargeable batteries or secondary cells 110 will be transmitted to and analyzed by the cloud-based server 270.

It is within the scope of this disclosure and as a non-limiting example, that the data relating to the make, model, and model year of the one or more rechargeable batteries or secondary cells 110 may be tagged with a unique identification code. This allows the cloud-based server 270 to collect information relating to the one or more rechargeable batteries or secondary cells 110 and monitor (or track) the overall health and/or performance of the one or more rechargeable batteries or secondary cells 110 throughout their life. Once the cloud-based server 270 determines that the overall life and/or performance of the one or more rechargeable batteries or secondary cells 110 falls below a pre-determined threshold, the cloud-based server 270 may wirelessly transmit a message to the charging device 100 and/or the device 112 indicating that the one or more rechargeable batteries or secondary cells 110 need to be replaced. It is within the scope of this disclosure and as a non-limiting example that the pre-determined threshold may be based on the data collected by the cloud-based server 270 relating to the number of times per day the one or more rechargeable batteries or secondary cells 110 are plugged into the charging device 100, the amount of time per day the one or more rechargeable batteries or secondary cells 110 are plugged into the charging device 100, the amount of time to raise the overall power within the one or more rechargeable batteries or secondary cells 110 by 1%, the amount of time it takes for the overall power within the one or more rechargeable batteries or secondary cells 110 to decrease by 1%, the health of the one or more rechargeable batteries or secondary cells 110, and/or based on other user data collected and analyzed relating to the same type of one or more rechargeable batteries or secondary cells 110.

The cloud-based server 270 may analyze and compare the data relating to the one or more rechargeable batteries or secondary cells 110 having the same make, model, and/or manufacturing year in order to build an overall profile for their performance. This data may be accessed by the one or more computing or control devices 128 and/or the one or more additional computing or control devices 184 and utilized when determining the amount of time to raise the overall power within the one or more rechargeable batteries or secondary cells 110 by 1% in step 216 and/or the amount of time it takes for the overall power within the one or more rechargeable batteries or secondary cells 110 to decrease by 1% in step 222. This may aid in ensuring that the time(s) calculated are as accurate as possible.

It is within the scope of this disclosure and as a non-limiting example that this data relating to the amount of time to raise the overall power within the one or more rechargeable batteries or secondary cells 110 by 1% in step 216 and/or the amount of time it takes for the overall power within the one or more rechargeable batteries or secondary cells 110 to decrease by 1% in step 222 measured may be averaged out with the similar data collected and analyzed by the cloud-based server 270. This aids in ensuring that the time(s) used by the charging device 100 are as accurate as possible and tailored to the type of the one or more rechargeable batteries or secondary cells 110 being used.

The charging device 100 and the method 185 of charging one or more rechargeable batteries or secondary cells 110 described and illustrated herein aid in increasing the overall life of the one or more rechargeable batteries or secondary cells 110.

Figure 4:
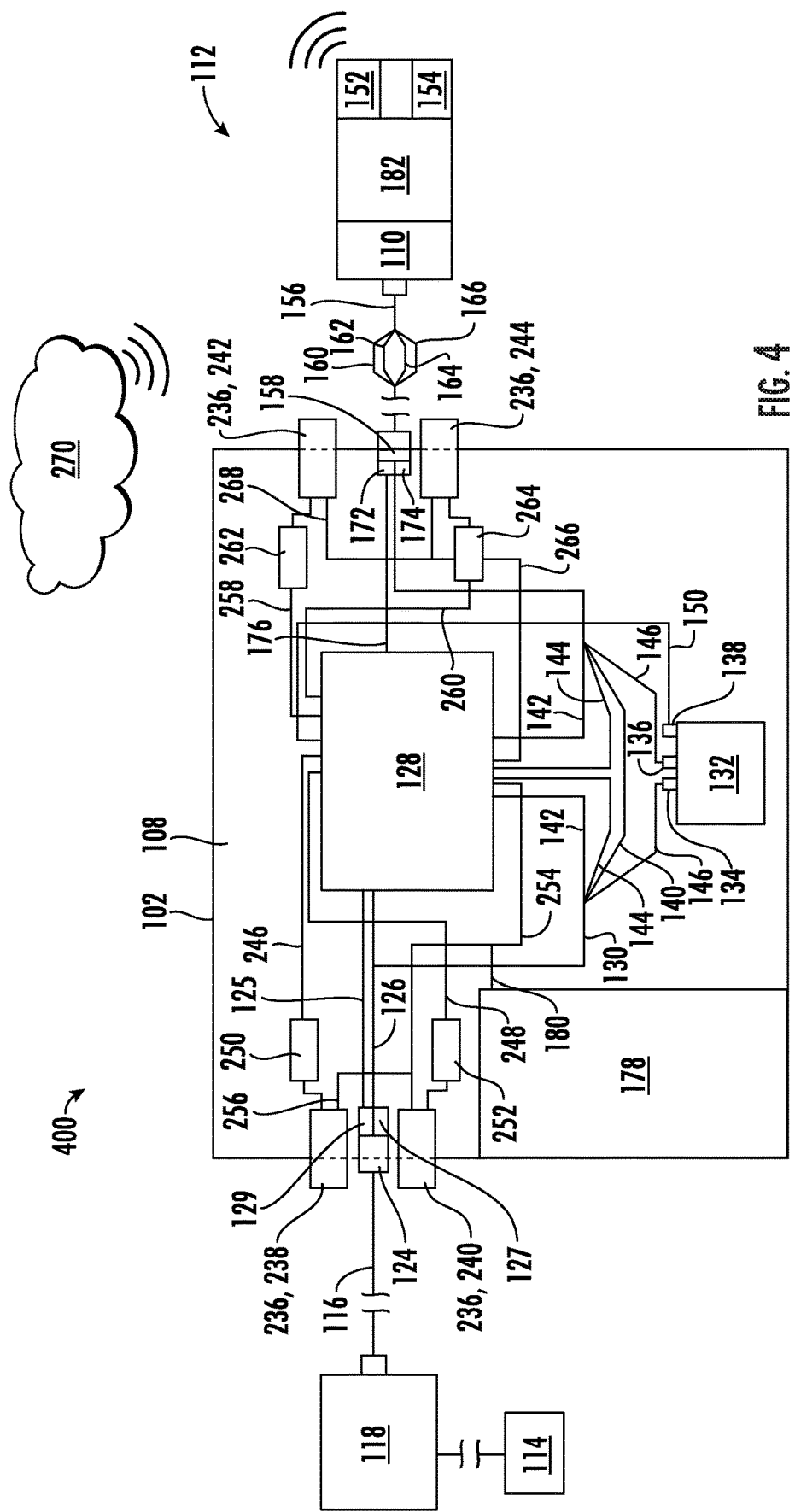
FIG. 4 is a schematic top plan view of a charging device according to an alternative embodiment of the disclosure.

FIG. 4 provides a schematic top plan view of a charging device 400 according to an alternative embodiment of the disclosure. The charging device 400 illustrated in FIG. 4 is the same as the charging device 100 illustrated in FIGS. 1 and 2, except where specifically noted below. Additionally, the charging device 400 illustrated in FIG. 4 may be operably configured in order to utilize the method 185 of charging one or more rechargeable batteries or secondary cells 110 described and illustrated in relation to FIGS. 1-3 of the disclosure. As illustrated in FIG. 4 and as a non-limiting example, the charging device 400 does not include the first transmitter and receiver 148 described and illustrated in relation to FIGS. 1-3 of the disclosure. As a result, the device 112 and the charging device 400 may be in communication with each other by utilizing the one or more first transmission lines 130 and/or the one or more fourth transmission lines 156. It is within the scope of this disclosure and as a non-limiting example that the one or more first transmission lines 130 and the one or more fourth transmission lines 156 may be a single line or separate lines that connect the charging device 400 to the one or more rechargeable batteries or secondary cells 110.

In accordance with the embodiment illustrated in FIG. 4 and as a non-limiting example, at least a portion of the third line 142 and/or the fourth line 144 of the one or more first transmission lines 130 may be in communication with at least a portion of the one or more computing or control devices 128 of the charging device 400. As a result, of the information needed to operate the charging device 400 may be transmitted through the third line 142 and/or the fourth line 144 of the one or more first transmission lines 130 to the one or more computing or control devices 128. Information relating to, but not limiting to, the charging mode selected by the user (not shown), the current power level of the one or more rechargeable batteries or secondary cells 110, the wake-up time(s) inputted by the user (not shown), the time, the amount of time until the wake-up time(s) inputted, the amount of time for the power within the one or more rechargeable batteries or secondary cells 110 to increase by 1%, the amount of time for the overall power within the one or more rechargeable batteries or secondary cells 110 to drop by 1%, and/or whether or not the one or more rechargeable batteries or secondary cells 110 will fall below a predetermined minimum power threshold before the wake-up charge 234 may be transferred through the third line 142 and/or the fourth line 144 for operation of the charging device 400.

The charging device 400 and the method 185 of charging one or more rechargeable batteries or secondary cells 110 described and illustrated herein aid in increasing the overall life of the one or more rechargeable batteries or secondary cells 110.

Figure 5:
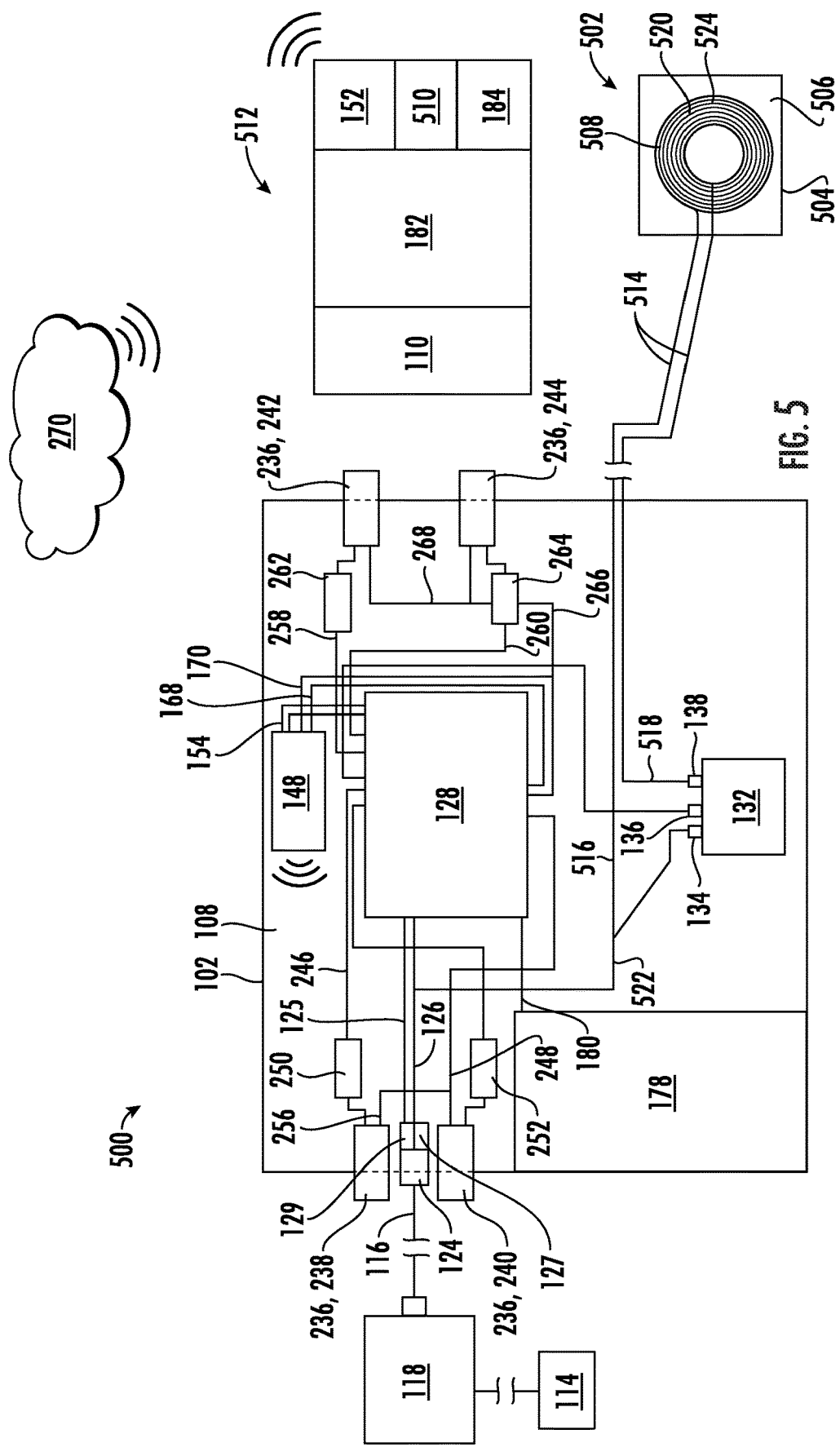
FIG. 5 is a schematic top plan view of a charging device according to another embodiment of the disclosure.

FIG. 5 provides a schematic top plan view of a charging device 500 according to an alternative embodiment of the disclosure. The charging device 500 illustrated in FIG. 5 is the same as the charging devices 100 and 400 illustrated in FIGS. 1, 2, and 4, except where specifically noted below. Additionally, the charging device 500 illustrated in FIG. 5 may be operably configured in order to utilize the method 185 of charging one or more rechargeable batteries or secondary cells 110 described and illustrated in relation to FIGS. 1-4 of the disclosure. As illustrated in FIG. 5 of the disclosure and as a non-limiting example, the charging device 500 may include a wireless power transfer device 502. It is within the scope of this disclosure and as a non-limiting example that the wireless power transfer device 502 may be an inductive charging device.

In accordance with the embodiment illustrated in FIG. 5 and as a non-limiting example, the wireless power transfer device 502 may include a housing 504 having a hollow interior portion 506 therein. The housing 504 may be of a size and shape needed to receive and/or retain at least a portion of one or more primary coils 508 therein that is operably configured to selectively interact with one or more secondary coils 510 within the device 512. At least a portion of the one or more secondary coils 510 may be in electrical communication with at least a portion of the one or more rechargeable batteries or secondary cells 110 thereby allowing for the transmission of an amount of power from the one or more secondary coils 510 to the one or more rechargeable batteries or secondary cells 110. It is to be understood that the interaction between the one or more primary coils 508 within the wireless power transfer device 502 and the one or more secondary coils 510 within the device 512 aid in supplying the one or more rechargeable batteries or secondary cells 110 with an amount of power needed to charge the one or more rechargeable batteries or secondary cells 110.

In order to supply the one or more semiconductor devices 132 with an amount of power needed to charge the one or more rechargeable batteries or secondary cells 110, the charging device 500 may include one or more first transmission lines 522. At least a portion of one end of the one or more first transmission lines 522 may be connected to at least a portion of the one or more third transmission lines 126. Additionally, at least a portion of an end of the one or more first transmission lines 522, opposite the one or more third transmission lines 126, may be connected to at least a portion of the first terminal 134 of the one or more semiconductor devices 132. As a result, the one or more first transmission lines 522 provide an electrical connection between the external power source 114 and the one or more semiconductor devices 132.

As best seen in FIG. 5 and as a non-limiting example, the one or more primary coils 508 may include one or more primary coil lines 514 having a first end portion 516, a second end portion 518, and an intermediate portion 520 interposed between the first and second end portions 516 and 518. At least a portion of the first end portion 516 of the one or more primary coil lines 514 may be connected to at least a portion of the one or more first transmission lines 522 at a location between the one or more semiconductor devices 132 and the one or more third transmission lines 126. Additionally, at least a portion of the second end portion 518 of the one or more primary coil lines 514 may be connected to at least a portion of the second terminal 136 of the one or more semiconductor devices 132.

In accordance with an alternative embodiment of the disclosure and as a non-limiting example, at least a portion of the first end portion 516 of the one or more primary coil lines 514 may be connected to at least a portion of the first terminal 134 of the one or more semiconductor devices 132. As a result, it is therefore to be understood that at least a portion of both the one or more primary coil lines 514 and at least a portion of the one or more first transmission lines 522 may be connected to at least a portion of the first terminal 134 of the one or more semiconductor devices 132.

According to the embodiment illustrated in FIG. 5 and as a non-limiting example, the intermediate portion 520 of the one or more primary coil lines 514 may extend outside the housing 102 of the charging device 500 and may be wound to have one or more coils 524 forming the one or more primary coils 508 of the wireless power transfer device 502. At least a portion of the one or more coils 524 may be received and/or retained within at least a portion of the housing 504 of the wireless power transfer device 502. It is therefore within the scope of this disclosure and as a non-limiting example that at least a portion of the wireless power transfer device 502 may be disposed outside the housing 102 of the charging device 500. As a result, the wireless power transfer device 502 may be selectively connectable and disconnectable to and/or from the charging device 500 as a separate component.

In the same manner as described previously herein, the one or more semiconductor devices 132 may be operably configures to selectively allow the transfer of an amount of power from the external power source 114 to the wireless power transfer device 502. It is within the scope of this disclosure and as a non-limiting example that the one or more semiconductor devices 132 may be operably configured to allow a variable amount of power to be transferred from the external power source 114 to the wireless power transfer device 502.

When instructed, the one or more semiconductor devices 132 may be instructed to allow for the passage of an amount of power therethrough to the wireless power transfer device 502. The alternating current running through the one or more primary coils 508 creates a magnetic field therein that fluctuates strength based on the amount of power provided. The changing magnetic field created within the one or more primary coils 508, creates an alternating electric current within the one or more secondary coils 510. The alternating electric current within the one or more secondary coils 510 may be converted into a direct current using a rectifier (not shown) that is used to charge the one or more rechargeable batteries or secondary cells 110.

The charging device 500 and the method 185 of charging one or more rechargeable batteries or secondary cells 110 described and illustrated herein aid in increasing the overall life of the one or more rechargeable batteries or secondary cells 110.

Figure 6:
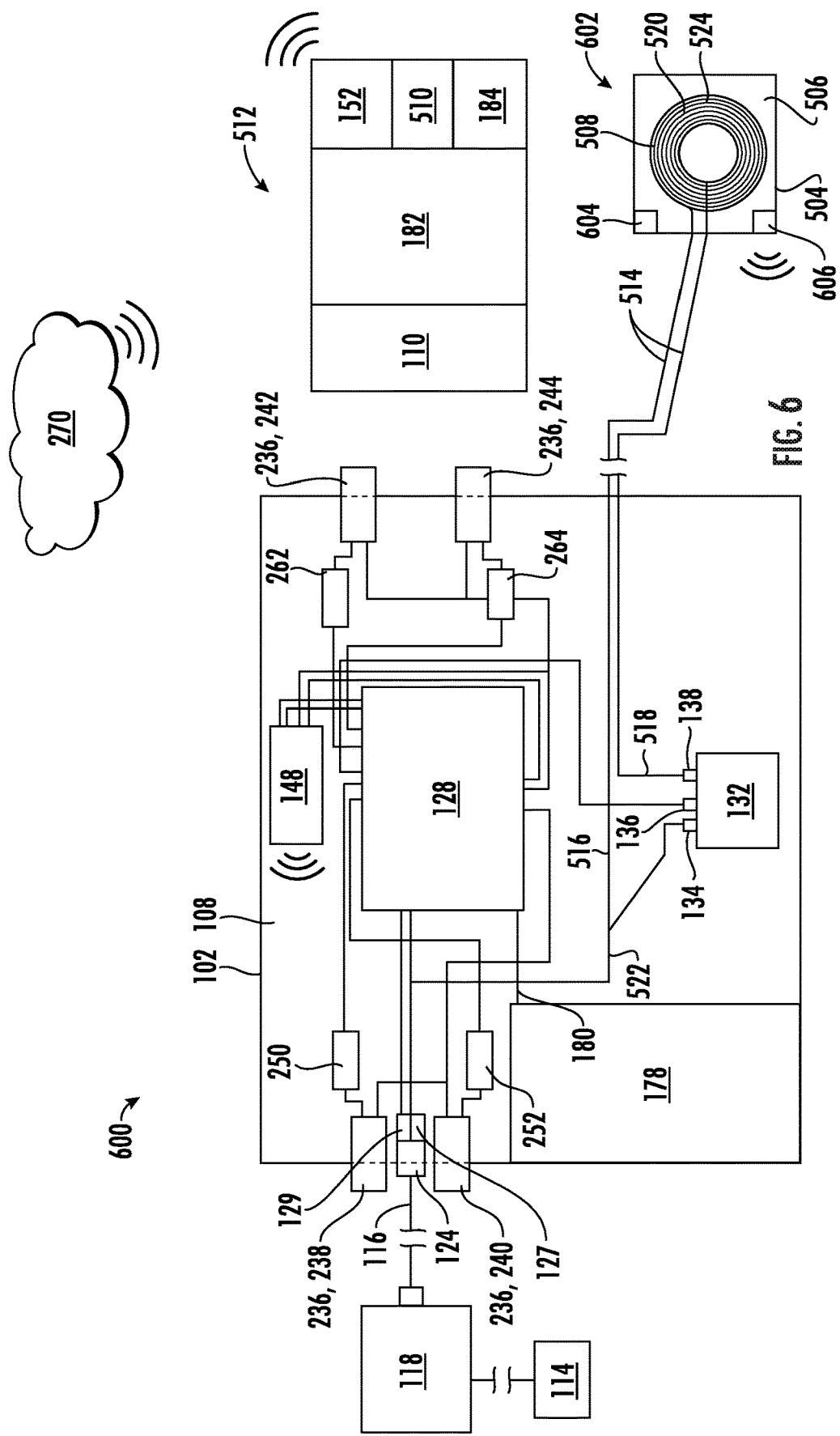
FIG. 6 is a schematic top plan view of a charging device according to yet another embodiment of the disclosure.

FIG. 6 provides a schematic top plan view of a charging device 600 according to yet another embodiment of the disclosure. The charging device 600 illustrated in FIG. 6 is the same as the charging devices 100, 400, and 500 illustrated in FIGS. 1, 2, 4, and 5, except where specifically noted below. Additionally, the charging device 600 illustrated in FIG. 6 may be operably configured in order to utilize the method 185 of charging one or more rechargeable batteries or secondary cells 110 described and illustrated in relation to FIGS. 1-5 of the disclosure. As illustrated in FIG. 6 of the disclosure and as a non-limiting, at least a portion of a wireless power transfer device 602 may be in connection with at least a portion of the charging device 600.

In accordance with the embodiment illustrated in FIG. 6 and as a non-limiting example, the wireless power transfer device 602 may include one or more sensors 604 therein. The one or more sensors 604 within the wireless power transfer device 602 may be operably configured to sense and/or identify whether or not an amount of power is being transferred from the one or more semiconductor devices 132 to the wireless power transfer device 602.

At least a portion of the one or more sensors 604 of the wireless power transfer device 602 may be in communication with a third transmitter and receiver 606 which in turn is in wireless communication with the first and/or second transmitter and receivers 148 and 152. The one or more sensors 604 of the wireless power transfer device 602 may be operably configured to communicate to the third transmitter and receiver 606 whether or not power is being transferred from the one or more semiconductor devices 132 to the one or more primary coils 508 and/or how much power is being transferred from the one or more semiconductor devices 132 to the one or more primary coils. It is within the scope of this disclosure and as a non-limiting example that the third transmitter and receiver 606 may be capable of transmitting and/or receiving messages and/or signals wirelessly via a Wi-Fi connection, a Bluetooth connection, an electromagnetic wave connection, a cellular connection, a radio wave connection and/or any other type of communication that does not require a wired connection.

The data collected by the one or more sensors 604 of the wireless power transfer device 602 may be utilized by the one or more computing or control devices 128 of the charging device 600 and/or the one or more additional computing or control devices 184 of the device 512 to identify an error or failure within the charging device 600. In the event that the one or more computing or control devices 128 and/or the one or more additional computing or control devices 184 determine that power is being received by the wireless power transfer device 602 when the one or more semiconductor devices 132 have been instructed to prevent the transmission of power to the wireless power transfer device 602, a failure within the one or more semiconductor devices 132 may be identified. Once the failure has been identified, a message may be transmitted to the user (not shown) informing the user (not shown) of the failure.

The charging device 600 and the method 185 of charging one or more rechargeable batteries or secondary cells 110 described and illustrated herein aid in increasing the overall life of the one or more rechargeable batteries or secondary cells 110.

Figure 7:
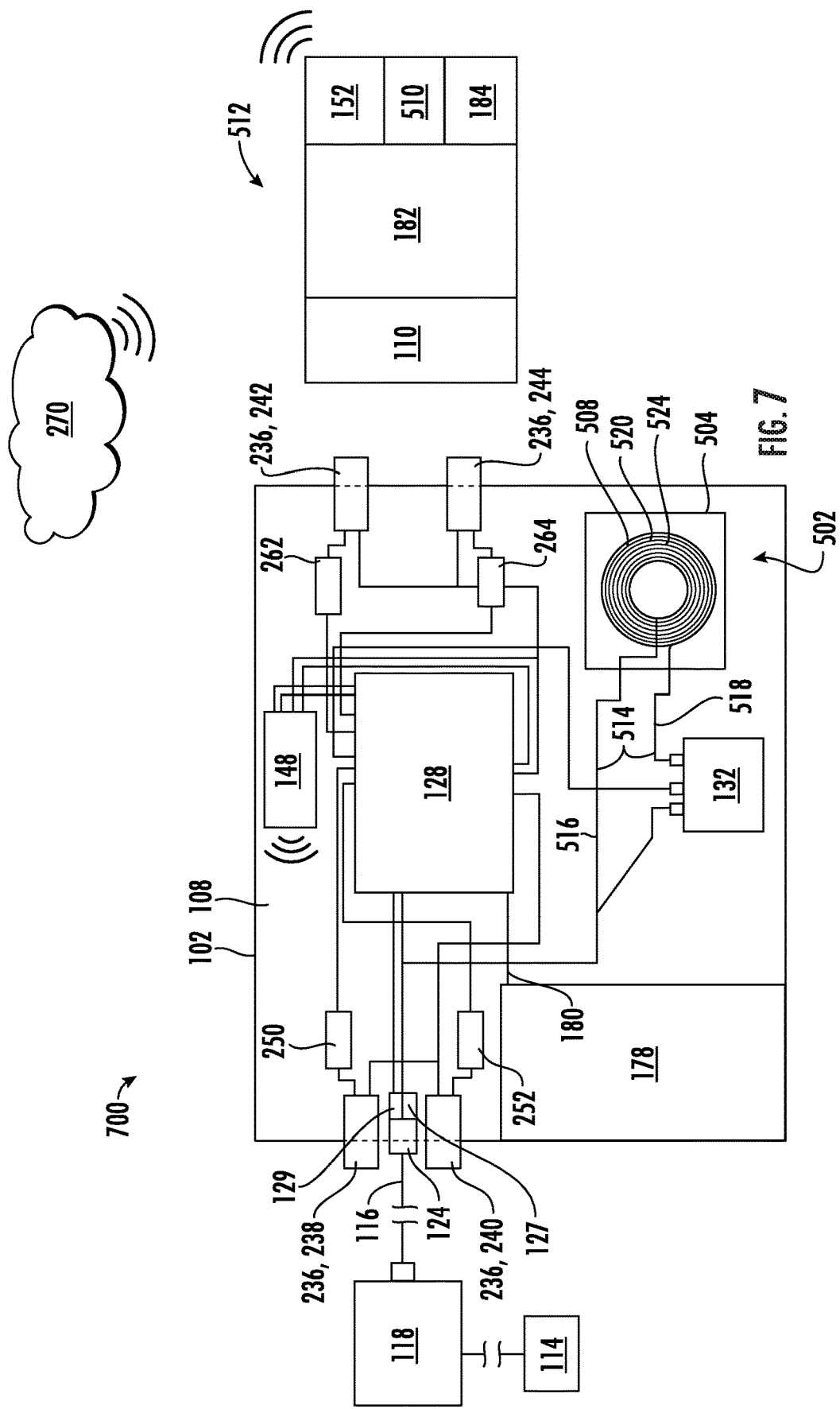
FIG. 7 is a schematic top plan view of a charging device according to still yet another embodiment of the disclosure.

FIG. 7 provides a schematic top plan view of a charging device 700 according to still yet another embodiment of the disclosure. The charging device 700 illustrated in FIG. 7 is the same as the charging devices 100, 400, 500, and 600 illustrated in FIGS. 1, 2, and 4-6, except where specifically noted below. Additionally, the charging device 700 illustrated in FIG. 7 may be operably configured in order to utilize the method 185 of charging one or more rechargeable batteries or secondary cells 110 described and illustrated in relation to FIGS. 1-6 of the disclosure.

In accordance with the embodiment illustrated in FIG. 7 and as a non-limiting example, at least a portion of the wireless power transfer device 502 may be received and/or retained within at least a portion of the housing 102 of the charging device 700. This aids in providing a charging device 700 that is an all-in-one solution.

The charging device 700 and the method 185 of charging one or more rechargeable batteries or secondary cells 110 described and illustrated herein aid in increasing the overall life of the one or more rechargeable batteries or secondary cells 110.

Figure 8:
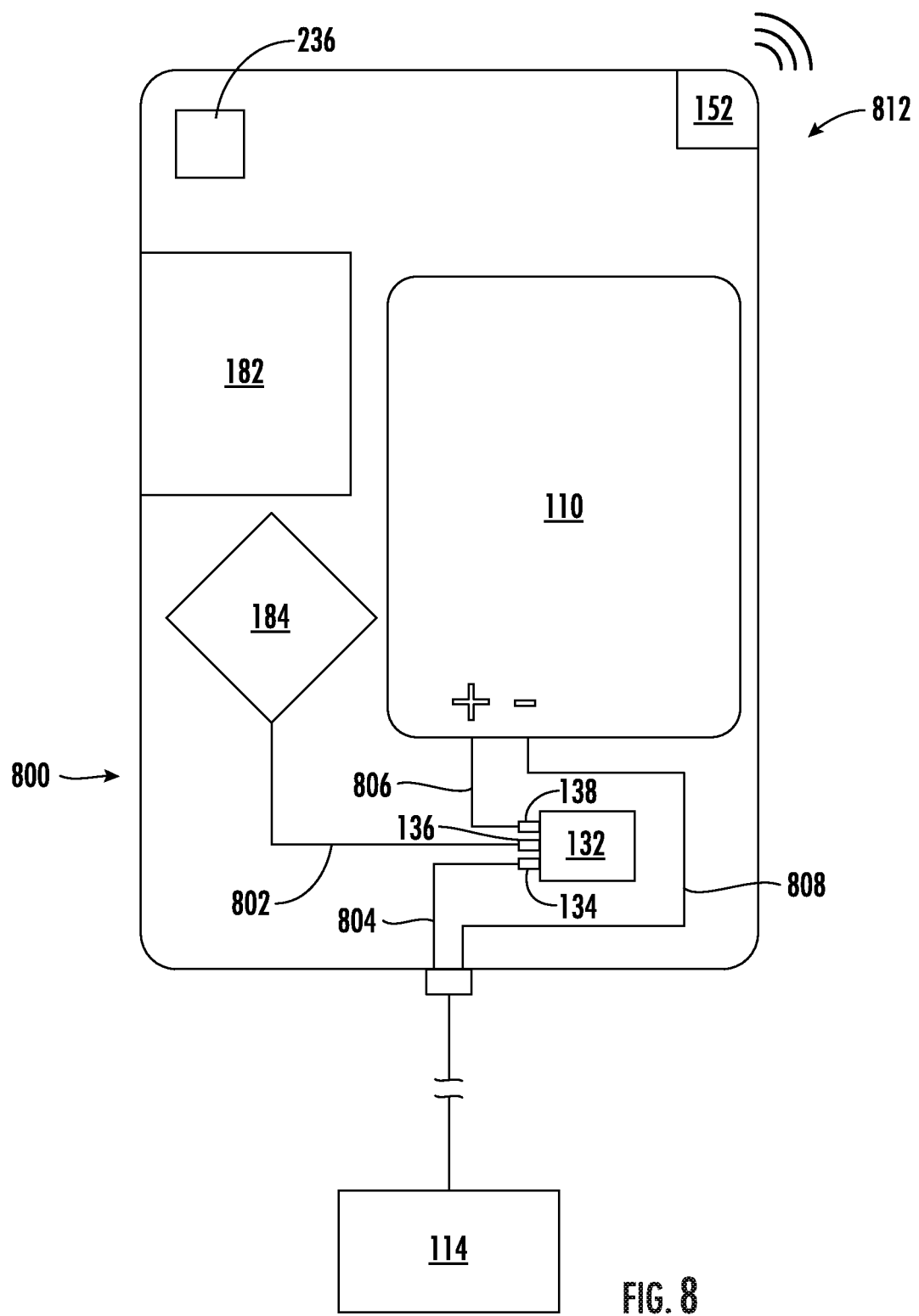
FIG. 8 is a schematic top plan view of a charging device according to still yet a further embodiment of the disclosure.

FIG. 8 provides a schematic top plan view of a charging device 800 according to still yet a further embodiment of the disclosure. The charging device 800 illustrated in FIG. 8 is the same as the charging devices 100, 400, 500, 600, and 700 illustrated in FIGS. 1, 2, and 4-7, except where specifically noted below. Additionally, the charging device 800 illustrated in FIG. 8 may be operably configured in order to utilize the method 185 of charging one or more rechargeable batteries or secondary cells 110 described and illustrated in relation to FIGS. 1-7 of the disclosure. As illustrated in FIG. 8 of the disclosure and as a non-limiting example, the charging device 800 is incorporated within the device 812.

In accordance with the embodiment illustrated in FIG. 8 and as a non-limiting example, the one or more semiconductor devices 132 are housed within the device 812 and are in communication with the one or more additional computing or control devices 184 of the device 812 by using a first line 802. As best seen in FIG. 8 and as a non-limiting example, at least a portion of an end of the first line 802 is connected to at least a portion of the one or more additional computing or control devices 184. Additionally, at least a portion of an end of the first line 802, opposite the one or more additional computing or control devices 184, may be connected to at least a portion of the second terminal 136 of the one or more semiconductor devices 132. In a similar way to as described in relation to the embodiments illustrated in FIGS. 1-7, the one or more additional computing or control devices 184 may be operably configured to selectively instruct the one or more semiconductor devices 132 to allow or deny the transmission of an amount of power from the external power source 114 to the one or more rechargeable batteries or secondary cells 110.

As illustrated in FIG. 8 and as a non-limiting example, a first transmission line 804 provides an electrical connection between the external power source 114 and the first terminal 134 of the one or more semiconductor devices 132. Additionally, at least a portion of a second transmission line 806 may provide an electrical connection between the one or more semiconductor devices 132 and the one or more rechargeable batteries or secondary cells 110. It is therefore to be understood that the first and second transmission lines 804 and 806 allow for an amount of power to be transmitted from the external power source 114 to the one or more rechargeable batteries or secondary cells 110. As a non-limiting example, the first and second transmission lines 804 and 806 may be a power-in line.

At least a portion of an end of a third transmission line 808 may provide a direct connection between the external power source 114 and the one or more rechargeable batteries or secondary cells 110. It is within the scope of this disclosure and as a non-limiting example that the third transmission line 808 may be a ground line.

The charging device 800 and the method 185 of charging one or more rechargeable batteries or secondary cells 110 described and illustrated herein aid in increasing the overall life of the one or more rechargeable batteries or secondary cells 110.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A method of charging a rechargeable battery, the method comprising:
providing an external source of power and one or more rechargeable batteries;
providing a charging device, wherein said charging device comprises one or more computing or control devices and one or more semiconductor devices, wherein at least a portion of said one or more semiconductor devices are in electrical communication with said external power source, and wherein at least a portion of said one or more semiconductor devices are in electrical communication with at least a portion of said one or more rechargeable batteries, and wherein said charging device has a plurality of charging modes including an overnight charging mode;
selecting the overnight charging mode;
inputting one or more wake-up times;
identifying a power level for said one or more rechargeable batteries;
determining an amount of time needed to increase said power level within said one or more rechargeable batteries by one percent;
determining an amount of time needed to fully charge said one or more rechargeable batteries, wherein said amount of time needed to fully charge said one or more rechargeable batteries is based on said power level for said one or more rechargeable batteries identified and said amount of time needed to increase said power level within said one or more rechargeable batteries by one percent determined; and
supplying said one or more rechargeable batteries with an amount of power from said external power source through said charging device at a time prior to said one or more wake-up times inputted substantially equal to said amount of time needed to fully charge said one or more rechargeable batteries determined.

2. The method of claim 1, wherein said one or more semiconductor devices are one or more transistors.

3. The method of claim 1, further comprising the step of: determining an amount of time needed for said power level within said one or more rechargeable batteries to drop by one percent.

4. The method of claim 3, further comprising the step of: determining if said power level within said one or more rechargeable batteries will fall below a pre-determined minimum threshold before said one or more rechargeable batteries are supplied with said amount of power, wherein said determination is based on said amount of time needed for said power level within said one or more rechargeable batteries to drop by one percent determined, said power level within said one or more rechargeable batteries, and an amount of time between said current time and said one or more wake-up times inputted.

5. The method of claim 4, further comprising the step of: supplying said one or more rechargeable batteries with an amount of power if it is determined that said power level within said one or more rechargeable batteries will fall below said pre-determined minimum threshold.

6. The method of claim 1, further comprising the steps of: providing a cloud-based server; and transmitting data to said cloud-based server relating to one or more of a manufacturer of said one or more rechargeable batteries, a model of said one or more rechargeable batteries, a manufacturing year for said one or more rechargeable batteries, number of times per day said one or more rechargeable batteries are connected to said charging device, an amount of time per day said one or more rechargeable batteries are connected to said charging device, an amount of time to increase a power level within said one or more rechargeable batteries by one percent, and an amount of time needed for said power level within said one or more rechargeable batteries to drop by one percent.

7. The method of claim 6, further comprising the steps of: analyzing said data transmitted to said cloud-based server; and assigning said one or more rechargeable batteries with a health level based on said data analyzed by said cloud-based server; and transmitting a message to one or more of said charging device and a device utilizing said one or more rechargeable batteries indicating that said one or more rechargeable batteries need to be replaced.

8. The method of claim 1, further comprising the steps of: providing one or more additional semiconductor devices within said charging device; identifying a failure within said one or more semiconductor devices of said charging device, wherein said failure identified is based on a determination that amount of power is being transmitted through said one or more semiconductor devices after said one or more computing or control devices have instructed said one or more semiconductor devices to prevent said transmission of power to said one or more rechargeable batteries; and instructing said one or more additional semiconductor devices to prevent said transmission of power from said external power source to said one or more rechargeable batteries.

* * * * *